May 15, 1956     C. R. STONE ET AL     2,745,428
DIAPHRAGM BALLCOCK
Filed Aug. 12, 1953
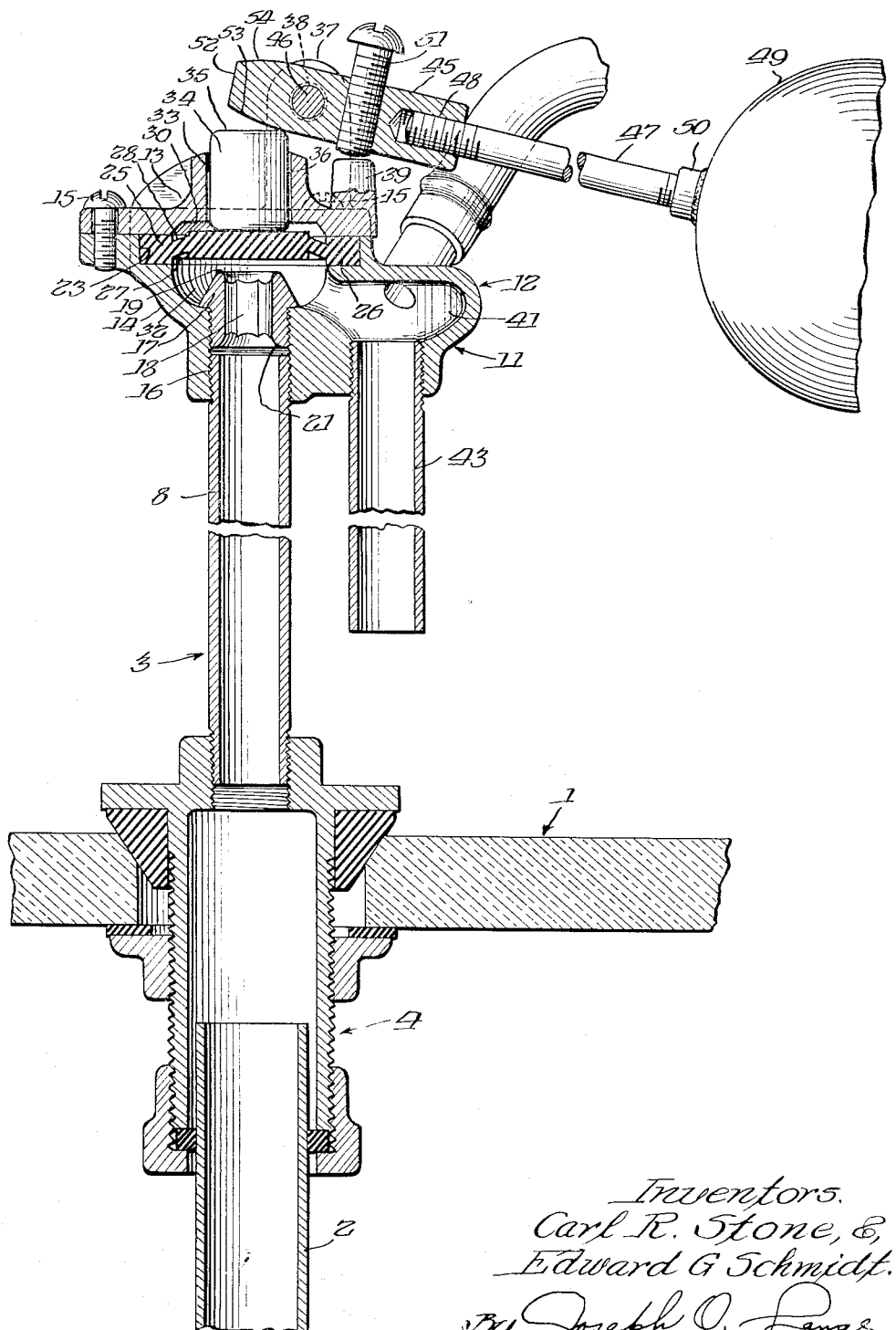
Inventors.
Carl R. Stone, &
Edward G Schmidt.
By Joseph O. Lange
Atty.

United States Patent Office 2,745,428
Patented May 15, 1956

2,745,428

DIAPHRAGM BALLCOCK

Carl R. Stone, Lombard, and Edward G. Schmidt, La Grange, Ill., assignors to Crane Co., Chicago, Ill., a corporation of Illinois Application August 12, 1953, Serial No. 373,736

2 Claims. (Cl. 137—446)

This invention relates generally to valves, and more particularly it pertains to float valves or diaphragm ball cocks of the type generally employed in plumbing closet tanks or the like.

It has been one of the problems of the plumbing industry to find and make available to the public a float valve of the type hereinafter described which would be free from chatter and dynamic building up of vibrations towards the end of the closing movement thereof. The latter action sometimes reaches the point of violent rocking and objectionable movement of the float arm causing serious damage or actual destruction of the valve besides the disturbing noise accompanying such action. In the past, this problem has been approached among other methods or structure by providing packing such as an O-ring around the plunger or stem part of the closure. This arrangement besides forming a seal, however, also creates resistance to the movement to dampen or prevent the formation of such vibrations. The use of friction for this purpose, of course, opposes desirable freedom of movement of the plunger and thus tends to cause sticking or binding. Further, it has been found that the friction decreases as the packing wears, thereby reducing the effectiveness of the dampening action and making the valve increasingly subject to chatter and destructive vibration in the course of service.

The present invention, on the other hand, does not make use of friction, but rather solves this problem by varying the force applied to the closure so as to substantially balance or more precisely to only slightly exceed the varying hydraulic pressure on the underside and thus prevent slamming of the closure member against the seat and subsequent reopening and setting up of a harmonic opening and closing action of increasing intensity.

It is accordingly one of the important objects of the invention to provide an improved float valve or ball cock particularly for use in closet tanks which eliminates chatter without adding friction.

Another object is to provide a float valve or ball cock having a positive type automatic dampening feature.

A further object is to provide a ball cock having a particular means for the elimination of chatter which is not subject to change because of wear.

A still further object is to provide a ball cock which is longer lasting and more durable and which requires virtually no replacement of parts or maintenance.

Another object is to provide a device of the type described having extreme ease of operation by virtue of maximum leverage when maximum force is required and the elimination of excess friction.

Yet another object is to provide a ball cock in which the closure and actuating plunger have complete freedom of movement without any tendency to bind or stick.

A further object is to provide a relatively simple ball cock which is more economical to produce and more effective in operation.

Other objects and advantages will become more readily apparent upon proceeding with the specification read in light of the accompanying drawing in which The single figure is a center sectional view of a preferred form of the present invention shown in the open position.

Referring in detail to the drawing, 1 is a fragmentary portion of a flush tank through which a ball cock or float supply valve generally designated 3 and constructed according to this invention is mounted by means of the usual fluid tight connection generally designated at 4, the water supply line 2 extending into this connection at the bottom thereof. Rising from this connection is a standpipe 8 on the upper end of which is mounted as by threading at 16 the body or casing of the ball cock generally designated 12.

The body 12 is preferably separable and is made up of an upper and lower portion 13 and 14, respectively connected together as by means of screws 15. Within the said body is a ported seat 17 which is preferably removable and threaded on the same threads or extension of the same threads 16 as receive the standpipe 8. The lower body portion 14 is annularly recessed or counter-bored at 23 for reception of a substantially flat disc-like diaphragm 25 of rubber or the like material which extends across the hollow interior 30 of the body and serves as a valve closure member when brought into fluid sealing engagement with the top of the seat member 17. Besides acting as a closure, the diaphragm fulfills the function of a gasket or seal by being interposed at its outer or rim portion 26 between the upper and lower body portions 13 and 14, the thickness of the diaphragm being slightly greater than the depth of the counterbore 23 so the same can be tightly clamped and compressed slightly between these portions for effecting fluid tight sealing.

It should be made clear at the outset that further details of the diaphragm 25 and valve seat 17 are the subject matter of co-pending application, Serial No. 375,179, filed August 19, 1953. It should suffice to say that certain changes in the construction of these members have resulted in unexpected and unobvious reduction of the flow noise of the fluid passing through the valve when the same is closing to substantially eliminate this noise. Briefly, this is brought about by providing the underside of the diaphragm with an annular groove or recess 27 outwardly of the center seat contacting portion and of providing the seat member with a curved mouth at 21 leading into the port 18 at the bottom thereof and a crown 19 of constant radius at the top. The diaphragm is preferably formed with a second annular groove 28 in the top for better flexing of the member during operation and to permit reversal thereof if desired. Attention is invited to the co-pending application noted for further explanation of the operation and structure of these members and of the formation of the chamber 32 below the diaphragm.

The upper portion 13 of the body 12 is bored or recessed at 33 for reception of the cylindrical plunger 34 which extends into the hollow interior 30 engaging the top of the diaphragm for movement of the same into fluid sealed contact with the seat member 17. The upper portion of the body is also provided with a pair of spaced ears or projections 37 (only one being shown) coaxially apertured at 38 for pivotal support of the pin 46 of the float rod arm 45. This pin is preferably integral with or connected to the rod arm so as to rotate therewith and through the ears 37 for firmer support and greater lateral stability of the rod arm.

The float rod arm 45 is provided with a float rod 47 threadedly received therewithin at 48, at the outer end of which is the usual float or ball 49 secured thereto as by a threaded boss 50. Extending through the rod arm 45 which is preferably square or rectangular in cross section is a screw 51 for adjustably limiting the downward movement of the arm and the attached structure by contact with the stop 39 of the upper portion 13 of the body when the tank 1 is emptied during the flushing operation. Since the float rod arm 45 engages the top of the plunger 34 and the upward movement of the latter and of the diaphragm therebelow for valve opening is likewise limited, rotation of the screw 51 by an ordinary screw driver constitutes a simple and convenient way of adjusting the rate of flow through the valve commensurate with the considerations of noise and speed of filling.

Of particular importance to the present invention is the flat top or upper surface 35 of the plunger 34 which is normal to the axis and reciprocal movement thereof and the rounded or pointed front end 52 of the rod arm 45 which engage the plunger for depression of the same and of the diaphragm for valve closure in response to raising of the float 49 as the water level in the tank 1 rises. The upper and lower peripheral limits of the plunger 34 are preferably rounded as indicated. The front end of the float rod arm is defined at the bottom or underside by the curved surface 53 which engages the top of the plunger along a shifting or moving contact as the latter is depressed. The purpose of this will now be discussed.

As has been touched upon in the introduction, diaphragm ball cocks are peculiarly subject to chatter or excessive vibration frequently of a very destructive nature in the course of effecting closing. Tracing this action, when the valve is in the open position as shown in the drawing figure, inlet fluid entering the lower chamber portion 32 of the hollow interior 30 of the body below the diaphragm through the port 18 of the seat member 17 exerts pressure across the entire exposed undersurface of the diaphragm. The total of this pressure times this area is the force which must be overcome by the float assembly acting through the plunger 34 to deflect the diaphragm downwardly. As the center part of the diaphragm moves toward the seat 17, the space between the two for the outflowing of fluid from the port 18 lessens, the restriction producing an increasing pressure loss which at first slowly and later more rapidly decreases the total fluid force on the diaphragm. As the diaphragm continues to move towards the seat, a point is finally reached when the flow is so cut down that there is no longer any positive pressure within the chamber 32 to be exerted on the underside of the diaphragm, the fluid merely running into the cavity 41 of the lower portion of the body and being drawn through the hush tube 43 leading therefrom by the difference in fluid level between the outside and inside of the tube. When this point is reached, the total force on the underside of the diaphragm falls off to a value represented by the area covering the port 18 and seating surface 19 of the valve seat. The tendency is for the closure or diaphragm to overshoot or slam momentarily into contact with the valve seat when the force on the underside has suddenly been reduced and then rebound towards the open position again because of inherent resiliency of the closure and the effort of the pressure within the seat member to restore equilibrium by pushing the closure upwardly. Such upward movement, however, tends to go beyond the point of equilibrium in the opposite direction and the float and lever mechanism drive the closure downwardly again with renewed impetus to slam the same even harder against the valve seat thus to repeat the cycle and set into play a harmonic motion or vibration of increasing intensity until destructive proportions are reached.

Pertinent to this action is the buoyancy stored within the float member 49 by partial submersion thereof preliminary to upward movement when the tank is filling and the spring-like energy stored within the float rod 47 as it bends slightly under the initial loading of the upwardly moving float prior to actual movement of the plunger and diaphragm against the inlet pressure for the closing operation. When the fluid force on the underside of the diaphragm or back load suddenly decreases during the last phase of valve closure as described above, the said buoyant and spring-like energy of the float and float rod respectively is largely released, the float rod tending to straighten out and the float moving rapidly in the water, which aids in causing the diaphragm objectionably to snap into the closed position with added force for increased rebound from the seat thereby to more easily initiate the condition of harmonic oscillation or vibration.

Also contributing to the establishment of this action or condition is the preferred arrangement of spacing the top of the valve seat below the face of the diaphragm when the latter is in the unstressed position rather than upwardly curved or stretched by the fluid pressure as shown, so that a stretching or flexing of the diaphragm is necessary to close the valve. This insures opening of the valve on low inlet pressures because of the tendency of the diaphragm to resume its flat shape when the load is taken off the plunger, but, of course, also tends to support or increase the extent of rebound or movement of the diaphragm away from the seat after the initial contact with the same.

According to the present invention, the initiating of this vibration in the first instance or the development of the same into destructive proportions is prevented by substantial balancing of the fluid pressure under the diaphragm by the leverage arrangement and plunger acting from above, or more precisely by holding the force on the top of the diaphragm to a value only slightly exceeding the total force exerted by the inlet fluid on the lower side so as to give a controlled and smooth closing, free from the usual vibration and noise.

Inasmuch as maximum force is required to overcome the fluid pressure when the valve is in the full open position maximum leverage is provided by the lever assembly or float means comprising respectively the float 49, float rod 47 and float rod arm 45 at the beginning of the closing movement. As the diaphragm is depressed the said leverage acting on the plunger decreases by shifting or moving the contact of the float rod arm forwardly and away from the fulcrum pin or point of pivot at 46, thus decreasing the force applied to the diaphragm. The bottom of the rod arm 45 is so shaped at 53 and the contact so shifts or moves between the same and the top surface 35 of the plunger as to decrease the leverage and the applied force slowly at the very beginning of the pivotal movement of the float means and then at a faster rate until the pressure loading on the underside of the diaphragm reaches the point of rapid reduction as it nears the seat 19. At this time, the leverage rapidly decreases to compensate for the same and thus prevents the application of too great a closing force tending to put the closure member into a state of unbalance as previously described.

The curved surface 53 of the rod arm 45 is preferably arcuate in form, to achieve the results above described, the center of the arc preferably falling between the center of the pivot pin 46 and the center of the plunger 34. In the form illustrated in the drawing, the center is located slightly forward of and above the pivot 46 and approximately in line with the inner edge 36 of the plunger when the lever arm is in a horizontal position. The latter disposition of the center is particularly advantageous in that the point of contact between the rod arm 45 and plunger 34 for the open position of the valve is approximately at the inner edge 36 of the plunger, giving the contact a greater range of travel across the top of the plunger for the desired change of leverage. As to the radius of the surface 53, this is preferably selected so as to bring the point of contact between the rod arm and plunger approximately to the center of or half way across the latter at the end of the float assembly movement, to provide a center line loading of the plunger and of the diaphragm therebelow for more uniform and effective seating of the latter member in the closed position. The surface 53 extends across the entire width of the rod arm so that the contact between the latter and the flat upper surface of the plunger is actually a line bearing. Since the pivot pin 46 is integral or otherwise adapted to turn with the rod arm and the pivotal support thereof is at each side within the ears 37, the said line contact is maintained for better load distribution with smoother acting and longer wearing float operation. For reversal of the lever parts and attendant longer life, the upper surface of the rod arm is likewise curved at 54, the surface being a duplicate of surface 53 and functions for the same purpose upon reversal or alternate mounting referred to.

Of great significance in the present invention is that positive automatic dampening is provided without the use of frictional means generally employed which has retarded free actuation of the plunger and also reduced its effectiveness because of wear. Although the tendency of the diaphragm to reopen after it originally makes contact with the seat is largely eliminated by the reduction of the closing force for a smooth seating, any reopening that may take place will be immediately countered by the application of increased force acting in the direction of closing as the result of increased leverage and applied force as the float arm pivots in the reverse direction. It will be understood that the greater the opening movement, the greater the increase in force working against te same. In this manner, the movement is quickly dampened or brought to a halt and the diaphragm closure member returned to the seat contacting position. If there is still some tendency to vibrate or rebound from the seat the slight reopening will again be compensated for in the same way and this cycle will be repeated until the movement is dissipated and the closure member is firmly seated. The closure member will ordinarily be dampened down to an imperceptible movement in one or two oscillations in contrast to the rapid build-up of the vibrations to audible and destructive proportions where dampening is not used.

The present arrangement provides positive dampening by endwise abutting contact of the plunger 34 with the rod arm 45 which is not subject to change of adjustment or loosening because of wear as in the case of the usual friction packing around the plunger. In the latter case, the valve is also subject to leakage around the packing which is avoided in the present invention by the use of the sealed diaphragm within the body. Further, the use of friction around the plunger to prevent the building up of vibrations also restricts free movement thereof and tends to produce binding and sticking, all of which is avoided in the present invention.

It is thus seen that an extremely simple and effective diaphragm ball cock or float valve has been provided which in particular takes advantage of the unobvious use of leverage for the control and elimination of one of the most perplexing problems in the float valve field; namely, that of chatter or building up of dynamic vibrations during final closure of the valve.

Although a particular embodiment has been illustrated and described, the invention should not be limited to that embodiment or to the specific details thereof, but rather should be measured by the appended claims falling within the spirit of the invention.

We claim:

1. A ball cock comprising a body having an inlet and outlet and a ported seat in fluid communication therewith, a flexible diaphragm closure member within said body engageable with said ported seat for the closed valve condition, a plunger freely movable within said body for depression of said diaphragm member into the closed position, the movement of the plunger being normal to the plane of said ported seat, said plunger having flat upper and lower ends extending substantially to the periphery of the plunger and parallel to the plane of said ported seat, said plunger being of substantially uniform cross section between said upper and lower ends thereof, float actuated lever means pivotally mounted on said body and cooperating with said plunger to effect the closing of the diaphragm, said lever means having a single pivot and including a float element at one end for actuating the said means, said pivot being intermediate the plunger and float element, said lever means being curved on the underside at the end opposite the float element for rocking engagement with the flat upper end of the plunger along a contact which moves away from the pivot of the lever means during the closing movement of said diaphragm and across at least a major portion of the distance between the portion of the periphery of the plunger nearest said pivot and a point substantially halfway across the flat upper end, the contact between the lever means and plunger terminating substantially at the halfway point at the end of the closing movement, said pivot of the lever means being in close proximity to but not within the edge of plunger nearest the pivot, said pivot also being at least slightly above the upper end of the plunger in both the open and closed valve positions.

2. The subject matter of claim 1, said body supporting the lever means in pivotal movement by means of spaced portions containing coaxial bores, said lever means being disposed between said spaced portions and having fixed means projecting within said bores for relative rotation therewithin, the axis of said coaxial bores and fixed means being substantially parallel to the plane of said ported seat, the axis further being so disposed that points thereon equidistant from the center of the lever means through which the axis passes are also substantially equidistant from a line through the centers of the flat upper and lower ends of the plunger, the curved underside of the lever means further being adapted to engage the flat upper end of the plunger substantially across the entire width thereof in the course of progressive movement along the said flat upper end during actuation of the valve into the closed position.

References Cited in the file of this patent

UNITED STATES PATENTS

| | | |
|---|---|---|
| 1,212,056 | Hill | Jan. 9, 1917 |
| 1,787,420 | Peitzman | Dec. 30, 1930 |